Patented Aug. 21, 1951

2,565,332

UNITED STATES PATENT OFFICE 2,565,332

DEFEATHERING AND DEPILATING COMPOUND

Richard D. Trelease, Chicago, Ill., assignor to Swift & Company, Chicago, Ill., a corporation of Illinois No Drawing. Application May 17, 1948, Serial No. 27,611

7 Claims. (Cl. 260—27)

This invention relates to an improved depilatory and, more particularly, to an improved composition for defeathering and depilating poultry carcasses.

In the meat packing industry it is often desirable, after the major portion of the feathers of a slaughtered fowl has been removed by mechanical picking means, to spray or paint the carcass with, or dip the carcass in, a hot waxy composition to remove the remaining feathers, pin feathers, hair, and the like, which composition solidifies or congeals on the surface of the carcass and is removed by stripping the coating together with the imbedded hair and feathers therefrom.

In general, the defeathering waxes of the prior art have consisted of appropriate mixtures of rosin, petroleum-base waxes, or vegetable waxes. Such mixtures, however, have certain disadvantages. For example, the melting point of the composition may be too high whereby scorching or searing of the surface of the fowl resulted, or it was necessary to dip the carcass more than once to get a coating of the desired thickness.

It has previously been proposed to add metallic soaps to such waxy mixtures to increase the viscosity thereof so that a coating of the desired thickness may be applied by a single dip of the carcass into the composition. These metallic soaps are useful but have the objection that they form a suspension which has a tendency to settle out and make reworking of the wax mixture necessary by the addition of new ingredients to bring the defeathering composition back to the proper formulation.

It has also been proposed to use polymerized rosin instead of wood or gum rosin as polymerized rosin has increased resistance to oxidation and less tendency to crystallize in solution than ordinary rosin. Also, polymerized rosin has excellent feather-removal properties and, because of its stability, does not sludge out of solution as rapidly as does ordinary wood or gum rosin.

Hydrogenated rosin has also been suggested in the prior art, but even though it is resistant to oxidation, such rosin has poor feather-removal properties, and consequently its use has not been too satisfactory.

It is, therefore, an object of the present invention to provide an improved defeathering compound.

Another object of the invention is to provide a defeathering compound of increased flexibility.

Another object of the invention is to provide a defeathering compound having a melting point below the searing temperature of poultry carcasses.

Another object of the invention is to provide a defeathering compound of increased viscosity whereby a coating of the desired thickness may be applied to a carcass by a single dip.

Other objects of the invention will be apparent from the description and claims which follow.

The defeathering composition of the present invention comprises mainly a petroleum wax and polymerized rosin to which is added a small amount of a synthetic polymer. I prefer to use a refined paraffin wax, such as a scale wax, having a melting point of about 125° F. to 130° F., although other petroleum waxes of crystalline or amorphous character may be used alone or in combination with the paraffin. The rosin that may be used is one that has been substantially polymerized, preferably approximately 33% polymerized, and has a melting point of around the boiling point of water, preferably about 213° F. The partially polymerized rosin and paraffin may comprise the large proportion of the composition: for example, about 90% to 98% of the defeathering composition. The rosin and paraffin may be present in about equal amounts, although the polymerized rosin may comprise a minor proportion, for example, from 20% to 45%, of the composition, and the paraffin may comprise a major proportion, for example, from 50% to 80%, of the composition. It has been found, however, that more advantageous results are secured when employing from 35% to 45% polymerized rosin and from 55% to 65% paraffin.

The synthetic polymer is added for the purpose of increasing the viscosity of the mixture so that a single dip of the carcass into the compound will suffice to give a coating of the desired thickness and also to lend flexibility to the coating whereby it may be easily stripped from the carcass. I prefer to use a hydrocarbon resin: for example, polymerized low-boiling olefins, such as the polybutenes. It has been discovered that from 0.2% to 3% of a polybutene, when added to the above paraffin and polymerized rosin mixture, is an effective amount for imparting to the mixture a high viscosity so that a thick waxy coating may be applied to the carcass by a single dip into the mixture. The polybutene may be present in a smaller amount if desired: for example, from 0.4% to 1% of the mixture.

Methods of preparing the polybutenes are well known in the art and form no part of the present invention. In general, the polymerization of isobutene may be carried out by the use of metal halide catalysts. The polymer may be obtained in a wide range of molecular weights ranging from 10,000 to 250,000, depending on the temperature at which the polymerization occurs. The polymers that I have found to be particularly useful for increasing the viscosity of the waxy composition are those having molecular weights of between 30,000 and 90,000, although the molecular weight is not critical.

The polybutenes are compatible with paraffin and polymerized rosin and form homogeneous solutions therewith. As such they have no tendency to settle out and thus make reworking of the mixture necessary. Since the polybutenes are compatible with paraffin, a small amount of a polybutene may be compounded directly with a small portion of the paraffin and this mixture then added to the remaining ingredients.

It is desirable to add to the above mixture a small amount of a high-melting-point petroleum or vegetable wax, such as montan wax, candelilla wax, or carnauba wax. Candelilla wax may be added to give more body to the composition. Carnauba wax may be added for imparting quick-setting properties to the mixture. In this latter connection, I have found montan wax particularly useful because of its high melting point and its resistance to oxidation.

The above-mentioned waxes have melting points within the range of 149° F. to 198° F.: candelilla wax having a melting point range of about 149° F. to 162° F., carnauba wax having a melting point range of around 184° F. to 196° F., and montan wax having a melting point range of between 161° F. and 198° F. It has been found that by using from 1% to 7% of these petroleum or vegetable waxes by weight based on the entire mixture and having a melting point within the range specified, satisfactory results are obtained. I prefer, however, to use from 2% to 5% of these waxes, as it has been found that such a range produces improved results. Instead of montan, candelilla, or carnauba waxes, other waxes having equivalent properties may be used. All of these organic materials are included within the term "wax" used in the claims.

In preparing the defeathering compound of the present invention, the ingredients may be placed in a tank and heated, with stirring, to around 220° F. whereby the ingredients are melted together. The mixture is then allowed to cool and solidify and then may be melted or rendered fluid enough for use by moderate heating to around 125° F. to 130° F. The mixture may be applied to poultry carcasses by dipping or in any other suitable manner. The mixture sets up quickly and may be easily stripped from the carcass.

As an example of actual plant practice, 55% of high-tensile-strength, fully refined paraffin with a melting point of 125° F. to 127° F. was mixed in a tank with 38% of polymerized rosin; 4% of crude montan wax; and 3% of a compounded mixture of paraffin and a polybutene having a molecular weight between 30,000 and 90,000, such compounded mixture being in the relative proportions of approximately 80% paraffin and 20% polybutene. The mixture was melted by heating to around 220° F. while agitating and was then allowed to cool. Moderate heat was applied to maintain a temperature of around 125° F. to 130° F. Poultry carcasses dipped into the wax mixture were quickly covered with a tough, adherent coating which set up quickly and with scarcely any tendency for the carcass to drip.

As another specific example of the operation of the present invention, 57% of high-tensile-strength, fully refined paraffin with a melting point range of 125° F. to 127° F. was mixed in a tank with 40% of polymerized rosin and 3% of a compounded mixture of paraffin and a polybutene, as specified in the foregoing example. Heat was applied and the mixture melted at around 220° F. and then allowed to cool. The mixture was maintained at a temperature of between 125° F. and 130° F. and was applied to poultry carcasses. The waxy composition set up quickly and was easily stripped from the carcass in large pieces, removing the imbedded hair, the pin feathers, and the like.

The defeathering compound may be easily reclaimed by boiling off the water and then pressing or centrifuging out the feathers. Since neither the polymerized rosin nor the polybutene has a tendency to crystallize out of solution, as occurs with many prior art compounds, less reworking of the present defeathering compound is necessary.

One important advantage of the present invention is that the compound is quite fluid when moderately heated yet sets up or congeals quickly upon application to a poultry carcass. The defeathering compound melts or becomes sufficiently fluid for use at approximately 125° F. to 130° F. Since the skin of chickens, for example, may be easily seared or scorched by the application of a similar rosin containing compound having a melting point much above 130° F., the present compound has particular utility since its working range is between 125° F. and 130° F.

The above characteristics of the defeathering composition of the present invention make it particularly useful, therefore, in defeathering poultry with no possibility of searing or darkening the skin of the birds with a consequent deterioration in value.

As used in the claims, the term "polybutene" refers to those polymerized compounds derived essentially from isobutene which may be prepared from isobutane containing various percentages of n-butane.

Obviously many modifications and variations of the invention as hereinbefore set forth may be made without departing from the spirit and scope thereof, and therefore, only such limitations should be imposed as are indicated in the appended claims.

I claim:

1. A composition for defeathering poultry which comprises about 50% to 80% paraffin, about 20% to 45% polymerized rosin, and about 0.2% to 3% of a polybutene having a molecular weight of between 30,000 and 90,000.

2. A composition for defeathering poultry which comprises about 50% to 80% paraffin, about 20% to 45% polymerized rosin, about 1% to 7% of a wax selected from the group consisting of candelilla wax, carnauba wax and montan wax, and about 0.2% to 3% of a polybutene having a molecular weight of between 30,000 and 90,000.

3. A composition for defeathering poultry which comprises about 55% to 65% paraffin, about 35% to 45% polymerized rosin, and about 0.4% to 1% of a polybutene having a molecular weight of between 30,000 and 90,000.

4. A composition for defeathering poultry which comprises about 55% to 65% paraffin, about 35% to 45% polymerized rosin, about 2% to 5% of a wax selected from the group consisting of candelilla wax, carnauba wax and montan wax, and about 0.4% to 1% of a polybutene having a molecular weight of between 30,000 and 90,000.

5. A composition for defeathering poultry comprising about 57% high-tensile-strength, fully refined paraffin having a melting point of about 125° F. to 127° F.; about 40% polymerized rosin; and about 3% of a compounded mixture of paraffin and a polybutene, said compounded mixture being in the relative proportions of approximately 80% paraffin and 20% polybutene, the polybutene having a molecular weight of between 30,000 and 90,000.

6. A composition for defeathering poultry comprising about 55% high-tensile-strength, fully refined paraffin having a melting point of about 125° F. to 127° F.; about 38% polymerized rosin; about 4% montan wax; and about 3% of a compounded mixture of paraffin and a polybutene, said compounded mixture being in the relative proportions of approximately 80% paraffin and 20% polybutene, the polybutene, having a molecular weight of between 30,000 and 90,000.

7. A depilatory composition comprising about equal proportions of paraffin and polymerized rosin, and about 0.2% to 3% polyisobutylene having a molecular weight substantially of the order of 30,000 to 90,000.

RICHARD D. TRELEASE.

REFERENCES CITED

The following references are of record in the file of this patent:

UNITED STATES PATENTS

| Number | Name | Date |
|---|---|---|
| 2,142,039 | Abrams et al. | Dec. 27, 1938 |
| 2,326,609 | Borglin | Aug. 10, 1943 |

Certificate of Correction

Patent No. 2,565,332                                      August 21, 1951

RICHARD D. TRELEASE

It is hereby certified that error appears in the printed specification of the above numbered patent requiring correction as follows:

Column 4, line 8, for "40°" read *40%*;

and that the said Letters Patent should be read as corrected above, so that the same may conform to the record of the case in the Patent Office.

Signed and sealed this 13th day of November, A. D. 1951.

[SEAL]

THOMAS F. MURPHY,
*Assistant Commissioner of Patents.*